(12) United States Patent
Laurent

(10) Patent No.: US 7,203,231 B2
(45) Date of Patent: Apr. 10, 2007

(54) METHOD AND DEVICE FOR BLOCK EQUALIZATION WITH IMPROVED INTERPOLATION

(75) Inventor: Pierre André Laurent, Bessancourt (FR)

(73) Assignee: Thales, Paris (FR)

(*) Notice: Subject to any disclaimer, the term of this patent is extended or adjusted under 35 U.S.C. 154(b) by 731 days.

(21) Appl. No.: 10/301,818

(22) Filed: Nov. 22, 2002

(65) Prior Publication Data
US 2003/0152142 A1    Aug. 14, 2003

(30) Foreign Application Priority Data
Nov. 23, 2001    (FR) .................... 01 15190

(51) Int. Cl.
*H03H 7/30* (2006.01)
*H03H 7/40* (2006.01)
*H03K 5/159* (2006.01)

(52) U.S. Cl. .................... 375/229; 375/231; 375/232; 375/233

(58) Field of Classification Search ............ 375/231, 375/232, 233, 229
See application file for complete search history.

(56) References Cited

U.S. PATENT DOCUMENTS

| 5,243,685 A |   | 9/1993 | Laurent |
|---|---|---|---|
| 5,513,215 A | * | 4/1996 | Marchetto et al. .......... 375/233 |
| 5,522,009 A |   | 5/1996 | Laurent |
| 6,016,469 A |   | 1/2000 | Laurent |
| 6,418,300 B1 |   | 7/2002 | Laurent |

FOREIGN PATENT DOCUMENTS

| EP | 0996247 A | 4/2000 |
|---|---|---|
| EP | 1032169 A | 8/2000 |
| WO | WO 0030274 A | 5/2000 |
| WO | WO 0131867 A | 5/2001 |

* cited by examiner

*Primary Examiner*—Mohammed Ghayour
*Assistant Examiner*—Aslan Ettehadieh
(74) *Attorney, Agent, or Firm*—Lowe Hauptman & Berner, LLP

(57) ABSTRACT

A method and device to equalize a signal received by a receiver after having traveled through a transmission channel, the signal including one data block and several probes located on either side of the data block. The method includes a step in which the impulse response of the channel is estimated before and after a data block n in taking account of the probes (Probe n 1 and Probe n) located on either side of the data block n and also of the probes that precede and follow the Probes n−1 and Probe n, the probes being weighted and combined with one another.

19 Claims, 4 Drawing Sheets

QPSK : optimization for a signal-to-noise ratio of 15dB
k=-3...4
Interpolators for maximum rotations of 20, 36, 66 and 120°

METHOD AND DEVICE FOR BLOCK EQUALIZATION WITH IMPROVED INTERPOLATION

BACKGROUND OF THE INVENTION

1. Field of the Invention

The present invention relates to a method and equalizer adapted notably to serial type modems.

Certain international standardization documents for transmission methods such as the STANAG (Standardization NATO Agreement) describe waveforms, to be used for modems (modulators/demodulators), that are designed to be transmitted on serial-type narrow bandwidth channels (3 kHz in general). The symbols are transmitted sequentially at a generally constant modulation speed of 2400 bauds.

Since the transmission channel used (in the HF range of 3 to 30 MHz) is particularly disturbed and since its transfer function changes relatively quickly, all these waveforms have known signals at regular intervals. These signals serve as references and the transfer function of the is channel is deduced from them. Among the different standardized formats chosen, some relate to high-bit-rate modems, working typically at bit rates of 3200 to 9600 bits/s which are sensitive to channel estimation errors.

To obtain a high bit rate, it is furthermore indispensable to use a complex multiple-state QAM (Quadrature Amplitude Modulation) type modulation, and limit the proportion of reference signals to the greatest possible extent so as to maximize the useful bit rate. In other words, the communication will comprise relatively large-sized data blocks between which small-sized reference signals will be inserted.

2. Description of the Prior Art

FIG. 1 shows an exemplary structure of a signal described in the STANAG 4539 in which 256-symbol data blocks alternate with inserted, known 31-symbol blocks (called probes or references), corresponding to about 11% of the total.

To assess the impulse response h(t) of the channel at the nth data blocks, there is a first probe (n−1) placed before the data block and a second probe (n) placed after the data block, enabling an assessment of the transfer function of the channel through the combined impulse response obtained by the convolution of:

the impulse response of the transmitter, which is fixed, the impulse response of the channel, which is highly variable, the impulse response of the receiver, which is fixed, these three elements coming into play to define the signal received at each point in time.

To simplify the description, it will be assumed hereinafter that this set forms the impulse response of the channel.

The DFE (Decision Feedback Equalizer) is commonly used in modems corresponding for example to STANAGs (such as the 4285) where the proportion of reference signals is relatively high and the data blocks are relatively short (for example 32 symbols in the 4285).

Another prior art method uses an algorithm known as the "BDFE" (Block Decision Feedback Equalizer) algorithm. This method amounts to estimating the impulse response of the channel before and after a data block and finding the most likely values of symbols sent (data sent) that will minimize the mean square error between the received signal and its estimation from a local impulse response that is assumed to be known.

This algorithm, shown in a schematic view with reference to FIG. 2, consists notably in executing the following steps:

a) estimating the impulse response of the channel having a length of L symbols, it being known that this impulse response is estimated, b) at the beginning of the data block n comprising N useful symbols, eliminating the influence of the symbols of the probe (n−1) placed before (L−1 first symbols), c) from the probe (n) placed after the data block, eliminating the participation of the symbols of the probe that are disturbed by the influence of the last data symbols (L−1 symbols), d) from the sample thus obtained, whose number is slightly greater than the number of data symbols (namely N+L−1), making the best possible estimation of the value of the N useful symbols most probably sent.

The step b) may consider the impulse response of the channel to be equal to $h_0(t)$ in the probe before the data block, namely Probe n−1, and the step c) may consider this response to be equal to $h_1(t)$ in the probe Prone n after the data block.

The step d) consists, for example, in assuming that the impulse response of the channel evolves linearly between $h_0(t)$ and $h_1(t)$ all along the data block.

The method according to the invention consists notably in adapting to the speed of evolution of the channel and thus, at all times, having an optimum level of performance while, at the same time, only negligibly increasing the computation power needed.

The description will make use of certain notations adopted, including the following:

$e_n$: complex samples sent, spaced out by a symbol and belonging to one of the constellations mentioned further above (known or unknown)

$r_n$: complex samples received (the values of n shall be explained each time and these samples may possible belong to a probe or to data)

L: length of the impulse response (in symbols) of the channel to be estimated

P: the number of symbols of a probe

N : the number of symbols of a data block $d^k_0 \ldots d_{p-1}$: known complex values of the symbols of the probe preceding the n+k ranking data block, it being understood that the current block has the rank n.

SUMMARY OF THE INVENTION

The invention relates to a method for the equalization of a signal received in a receiver after it has traveled through a transmission channel, said signal comprising at least one data block and several probes located on either side of the data block. The method comprises at least one step in which the impulse response of the channel is estimated before and after a data block n in taking account of the probes (Probe n−1 and Probe n) located on either side of the data block n and also of the probes that precede and follow the Probes n−1 and Probe n, said probes being weighted and combined with one another.

The method comprises for example at least one of the following steps: for each probe positioned before the data block to be processed and for each probe located after the data block to be processed, each of the probes is replaced by smoothened probes and then the impulse response $h_0$ before the data block and the impulse response $h_1$ after the data block are estimated.

According to another embodiment, the method may comprise at least the following steps: for each probe placed before the data block and for each probe placed after the data block, for example an associated impulse response is estimated and then, by weighting and combination, the impulse response $h_0$ before the data block and the impulse response $h_1$ after the data block are estimated.

The estimation can be made by minimizing the total mean square error given by:

$$E = \sum_{n=N_0}^{N_1} \left| \sum_{m=0}^{L-1} d_{n-m} h_m - r_n \right|^2$$

with
$d_{n-m}$=known signal sent
$h_m$=sample of the impulse response
$r_n$=received signal.

The method comprises, for example, a step in which the coefficients used for the smoothing of the probes are obtained by minimizing the mean square error of the interpolation error $$E(\theta) = \left| \sum_{i=0}^{M-1} a_i e^{j\theta(k_0+i)} - e^{jx\theta} \right|^2$$

where $\theta$ is the phase rotation, included between two extreme values $-A$ and $+A$ that depend on the speed of variation of the transfer function of the channel.

The method uses, for example, several sets of interpolation coefficients, each set being optimized for very precise conditions of reception (defined by an operating signal-to-noise ratio and a Doppler spread of the channel) where, at regular intervals, sets that are neighbors of the one being used are tried and where, for the subsequent part of the operation, the set chosen is the one that maximizes a demodulation signal-to-noise ratio that can be estimated in various ways.

The method is used for example for the demodulation of signals received in a BDFE.

The invention also relates to a device used to equalize the signal received after it goes through a transmission channel, said signal comprising at least one data block and several probes located on either side of the data block. The device comprises at least one means adapted to estimating the impulse response of the channel before and after a data block n in taking account of the probes (Probe n−1 and Probe n) located on either side of the data block n and also of the probes that precede and follow the Probes n−1 and Probe n, said probes being weighted and combined with one another.

The invention has the following advantages in particular:

The method enables adaptation to the speed of change of the channel and thus makes it possible, at all times, to have an optimal performance level while at the same time only negligibly increasing the required computation power.

BRIEF DESCRIPTION OF THE DRAWINGS

The present invention will be understood more clearly from the following description of an exemplary embodiment given by way of an illustration that is in no way restrictive, and is made with reference to the drawings of which.

MORE DETAILED DESCRIPTION

The idea implemented in the method according to the invention consists notably in estimating the impulse responses of the transmission channel of a signal before and after the data block to be processed, by means of an smoothing or filtering operation or again an interpolation.

The signal received by a receiver is transmitted first of all to an estimator whose function notably is to estimate the impulse response of the channel, respectively $h_0(t)$ and $h_1(t)$, before and after a data block n to be processed in considering the probes located on either side of the data n, but also the preceding and following probes, namely $h_{k0}(t)$ $h_{k0+1}(t)$ ... $h_0(t)$ $h_1(t)$ ... $h_{k1-1}(t)$ $h_{k1}(t)$, with $k_0$ smaller than or equal to 0 and $k_1$ greater than or equal to 1, each combined with a set of weights referenced respectively $a_{0\,...\,k1-k0}$ (to obtain $h_0(t)$) and $b_{0\,...\,k1-k0}$ (to obtain $h_1(t)$). This is in fact a filtering (or smoothing or interpolation) function whose effect notably is to reduce the noise level.

Then, with several sets of coefficients $a_i$ and $b_i$ available, the method enables the choice, at each time, of the coefficients that give the best results, enabling adaptation to the speed of variation of the channel.

Figure 1:
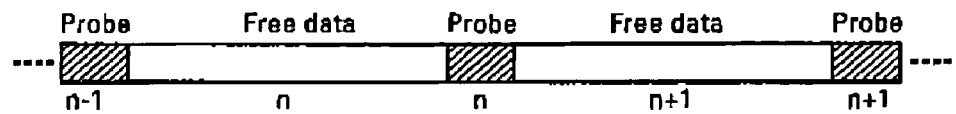
FIG. 1 shows a general example of the structure of the transmission data sent through a transmission channel.
Figure 2:
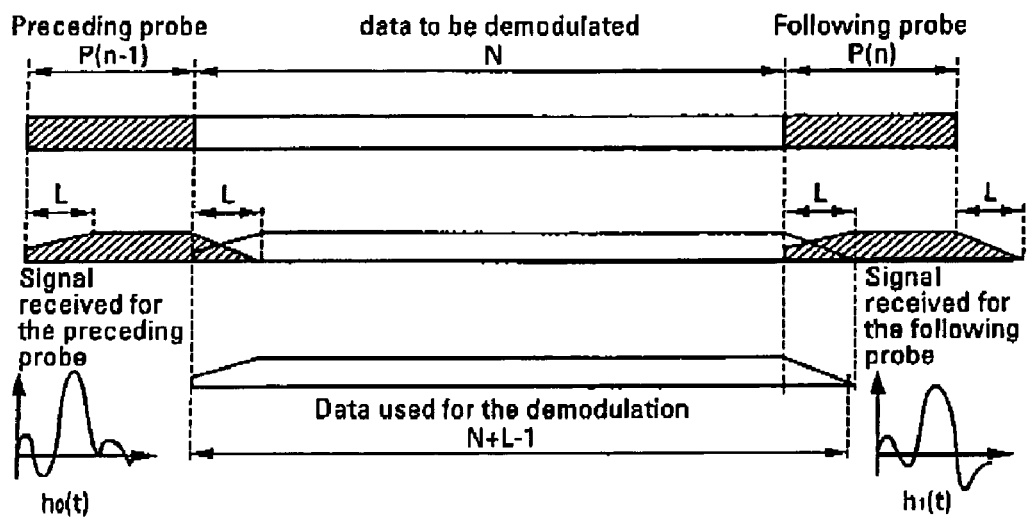
FIG. 2 shows the steps of the BDFE algorithm used according to the prior art.
Figure 3:
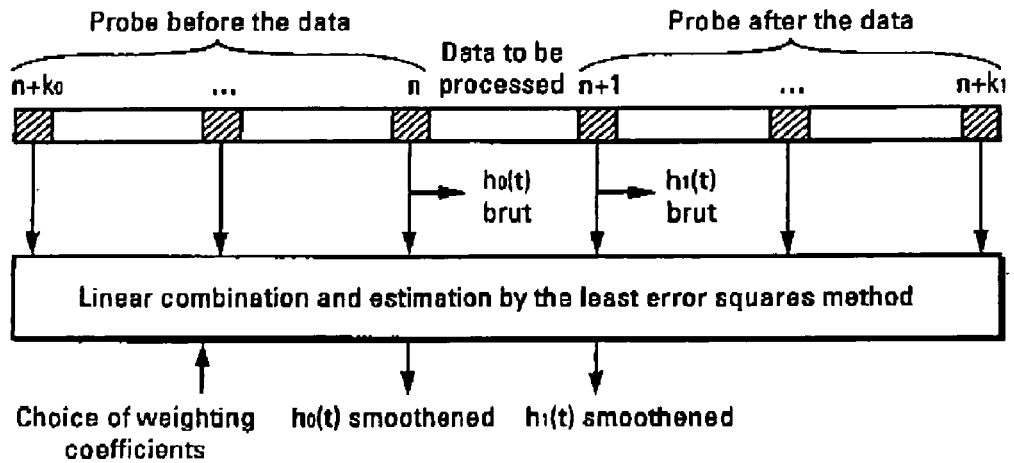
FIG. 3 is a block diagram of the different steps of the method according to the invention.

FIG. 3 gives a diagrammatic view in the form of a block diagram of the different steps implemented by the method according to the invention, where the smoothened variants (which are improved) of the impulse responses $h_0$ and $h_1$ are obtained by linear combination and then estimation by the least error squares method. The choice of the weighting coefficients is described in detail here below in the invention.

Figure 4:
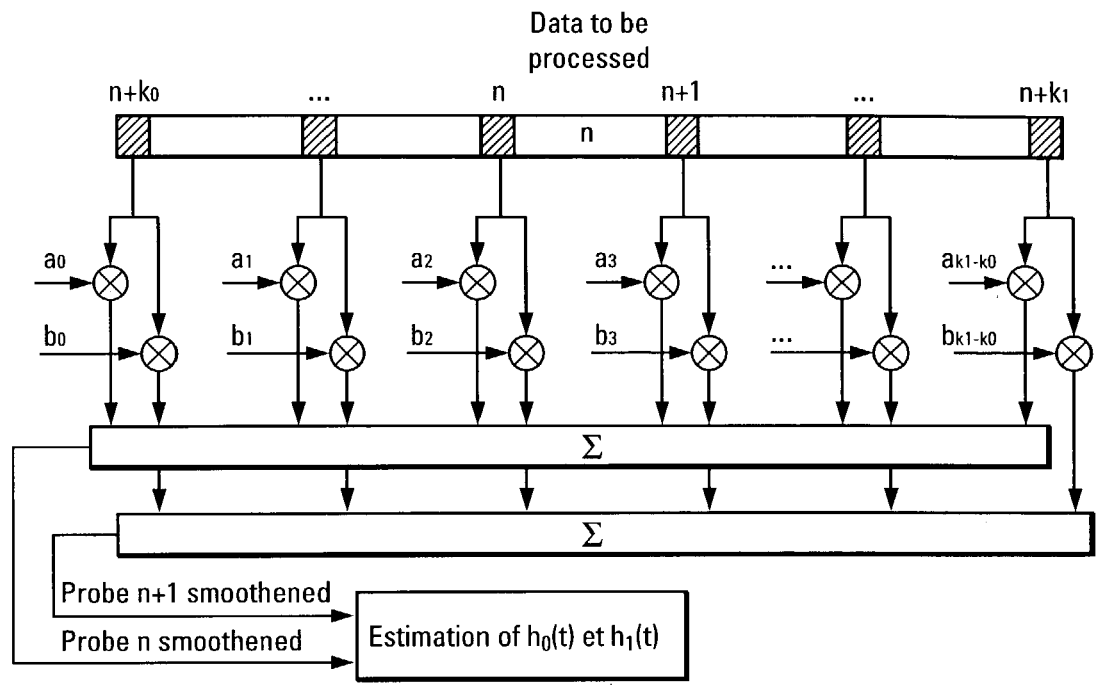
FIG. 4 is a first alternative mode of implementation of the invention.

FIG. 4 shows a first alternative mode of implementation of the methods according to the invention.

The method comprises inter alia the following steps:

1. The filtering of the time signal of the probes to generate to fictitious probes at the positions n and n+1 (Probe n−1 just before and Probe n just after the data block n to be demodulated), 2. The use of these two fictitious probes to compute $h_0$ then $h_1$ or else to compute both of them by means of a joint estimation algorithm which assumes that these impulse responses are not completely independent.

1—Filtering

The n+p (p=$k_0$ ... $k_1$) ranking probe is constituted by the P samples referenced $r_{n+p,\,0\,...\,P-1}$.

The filtering step consists, for example, in replacing the P samples of the probe $r_0$ before the data block, namely $r_{0,\,0\,...\,P-1}$, by modified samples $r'_{0,\,0\,...\,P-1}$ given by the simple relationship:

$$r'_{0,i} = \sum_{k=k_0}^{k=k_1} a_{k-k_0} r_{k,i} = \sum_{m=0}^{m=k_1-k_0} a_m r_{m+k_0,i} \quad (1)$$

$$i = 0 \ldots P-1$$

then in replacing the P of the samples of the probe $r_1$ after the data block, namely $r_{1,0 \ldots P-1}$, by modified samples $r'_{1,0 \ldots P-1}$ given by a simple relationship:

$$r'_{1,i} = \sum_{k=k_0}^{k=k_1} b_{k-k_0} r_{k,i} = \sum_{m=0}^{m=k_1-k_0} a_m r_{m+k_0,i} \quad (2)$$

$$i = 0 \ldots P-1$$

The coefficients $a_i$ and $b_i$ are, for example, optimized for the current values of $k_0$ and $k_1$, for a given signal-to-noise ratio and for a given speed of variation ("Doppler spread") of the transfer function of the channel.

If, in a particular waveform, the probes are assigned an individual phase rotation that is not zero and known, the samples $r_{n+p, 0 \ldots P-1}$ undergo the reverse rotation BEFORE their combination and, if necessary, the corrected samples r' undergo the forward rotation AFTER their computation.

An exemplary computation of the coefficients $a_i$ and $b_i$ is explained further below in the description.

2—Estimation

The impulse responses are estimated, for example, according to the least error squares method. By way of a non-restrictive example hereinafter in the description, we shall recall one of the simplest methods to be implemented.

It is sought to obtain the best estimation of the L samples of the impulse response h of the channel referenced $h_0 \ldots h_{L-1}$ (since the method is the same for $h_0$ and $h_1$, we omit the index of h).

The known sent signal is $d_0 \ldots d_{P-1}$, for a given probe and the signal to be processed is referenced $r_0 \ldots r_{P-1}$, (i.e. $r'_{0, 0 \ldots P-1}$ and $r'_{1, 0 \ldots P-1}$)

The impulse response h is estimated by minimizing the total quadratic error given by:

$$E = \sum_{n=N_0}^{N_1} \left| \sum_{m=0}^{L-1} d_{n-m} h_m - r_n \right|^2 \quad (3)$$

So that only the known symbols will come into play (i.e. $d_0$ to $d_{P-1}$ only), we take $N_0 = L-1$ and $N_1 = P-1$. The consequence of this, in particular, is that, during the previous filtering operation, only the P–L (instead of L) corrected values r' are computed.

The minimizing of E leads to the L following equations:

$$\sum_{n=L-1}^{P-1} d^*_{n-p} \left( \sum_{m=0}^{L-1} d_{n-m} h_m - r_n \right) = 0 \quad (4)$$

$$p = 0 \ldots L-1$$

which can be rewritten as follows:

$$\sum_{m=0}^{L-1} h_m \left( \sum_{n=L-1}^{P-1} d_{n-m} d^*_{n-p} \right) = \sum_{n=L-1}^{P-1} r_n d^*_{n-p} \quad (5)$$

$$p = 0 \ldots L-1$$

or again:

$$\sum_{m=0}^{L-1} A_{p,m} h_m = B_p \quad (6)$$

$$p = 0 \ldots L-1$$

with $$A_{p,m} = \sum_{n=L-1}^{P-1} d_{n-m} d^*_{n-p} = A^*_{m,p}$$

$$m = 0 \ldots L-1$$

$$p = 0 \ldots L-1$$

and $$B_p = \sum_{n=L-1}^{P-1} r_n d^*_{n-p}$$

$$p = 0 \ldots L-1$$

Since the matrix $A = \{A_{p,m}\}$ is Hermitian, the solution to the problem is soon found by using the Cholesky decomposition L–U, well known to those skilled in the art, where A=LU and:

L is a lower triangular matrix having only ones on the diagonal,

U is a higher triangular matrix where the elements of the diagonal are real.

In practice the matrices L and U are precomputed (for example in a read-only memory) since the matrix A is formed out of constant values.

Formally, it can be written that we should have Ah=B or LUh=B, which is resolved by bringing into play an intermediate vector y, in first of all resolving Ly=B then Uh=y (7).

This alternative mode of execution of the method is well suited is when the sequences sent for all the probes are identical, give or take one known phase rotation.

Figure 5:
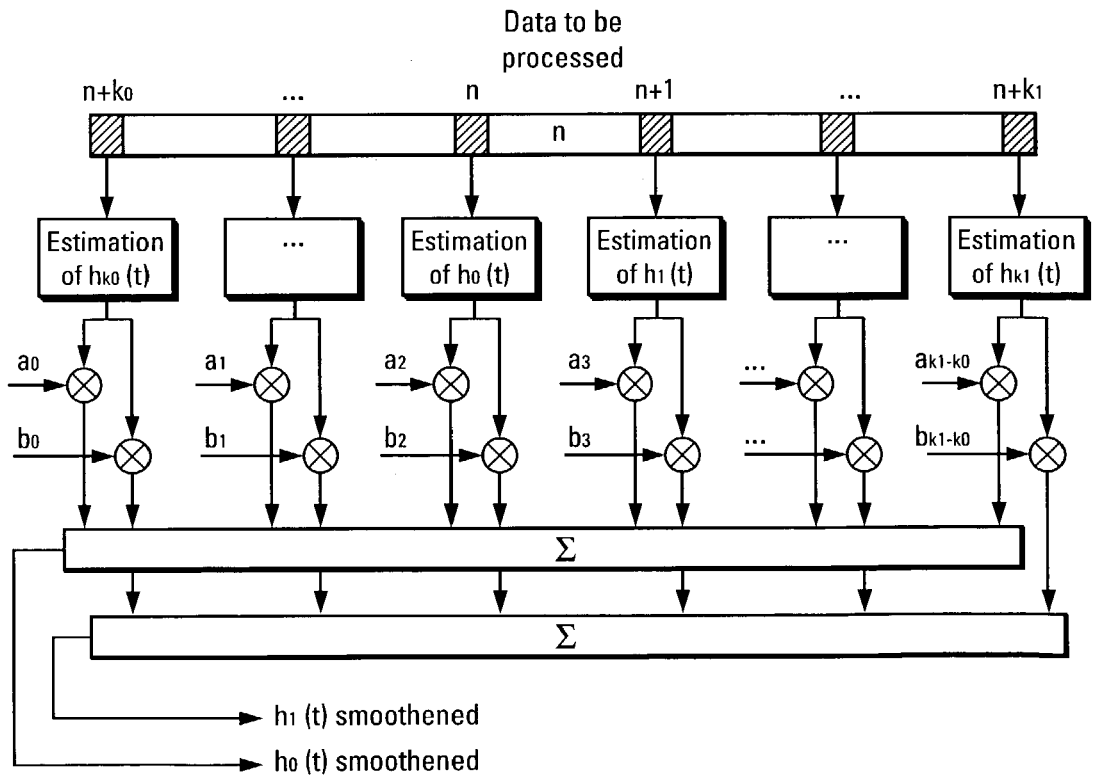
FIG. 5 is a second alternative mode of execution of the method according to the invention.

FIG. 5 gives a schematic view of the steps of a second variant for the implementation of the method that executes the above-mentioned steps 1 and 2 in the inverse order, namely:

The direct estimation of the impulse responses at the positions $n+k_0$, $n+k_0+1$, ..., n, n+1, ..., $n+k_1$ The smoothening of these impulse responses to obtain $h_0$ then $h_1$.

This second variant is particularly well suited when the (known) data conveyed by the probes vary from one probe to another, and cannot be deduced from one another by a simple phase rotation.

1—Estimation for this Second Variant

The method starts with an estimation of the $k_1-k_0+1$ impulse responses for all the probes available. The algorithm to be used is identical to the one that had been exposed for the variant 1. It gives the impulse responses $h_{k, 0 \ldots L-1}$ where k is included between $k_0$ and $k_1$, boundaries included.

2—Filtering

The filtering step is similar to the one performed in the variant 1 (FIG. 4).

The method computes the corrected (smoothened/filtered) impulse responses $h'_{0, 0 \ldots L-1}$ and $h'_{1, 0 \ldots L-1}$ by the following simple relationships:

$$h'_{0,i} = \sum_{k=k_0}^{k=k_1} a_{k-k_0} h_{k,i} = \sum_{m=0}^{m=k_1-k_0} a_m h_{m+k_0,i} \quad (8)$$
$$i = 0 \ldots L-1$$

$$h'_{1,i} = \sum_{k=k_0}^{k=k_1} b_{k-k_0} h_{k,i} = \sum_{m=0}^{m=k_1-k_0} b_m h_{m+k_0,i} \quad (9)$$
$$i = 0 \ldots L-1$$

As in the variant 1, the coefficients $a_i$ and $b_i$ depend on $k_0$, $k_1$, the signal-to-noise ratio of operation and the assumed Doppler spread of the transmission channel.

According to one alternative embodiment of the invention, the method uses filters with optimized coefficients for the filters.

The object of the interpolators notably is to make an estimation, on the basis of the true probes, located at the positions $k_0 \ldots k_1$ (with respect to the current frame), of the two probes or the two impulse responses before and after to be used for the current frame.

The criterion chosen consists for example in minimizing the mean square error of interpolation for a given maximum rotation of the impulse response between probes and for a given signal-to-noise ratio (which depends on the specifications).

Furthermore, the method requires, for example, that the interpolation should be perfect in the absence of noise for a zero phase rotation, enabling a maximum level of performance on a channel with slow variations. Experience shows that this constraint has a minimum effect on the interpolation noise when the number M of coefficients of the interpolations is an even number.

Each interpolator has M real coefficients: $a_{0 \ldots M-1}$ where M equals $k_1-k_0+1$.

The method seeks to minimize the mean square error:
for a given noise power value $\beta$ (i.e. a well-defined signal-to-noise ratio),
at a position x ranging from 0 to 1, it being known that the position 0 corresponds to the probe before the data block to be processed and concerns the $a_i$ values, and the position 1 to the probe after the data block to be processed (the $a_i$ values will then be replaced by the $b_i$ values,
in using the signal at the positions $k_0, \ldots, 0, 1, \ldots k_1=k_0+M-1$,
it being known that the phase rotation between two positions is equal to A at most in terms of absolute value ($A<\pi$),
with the constraint that the interpolation should be perfect for a zero phase rotation (perfect interpolation of the continuous).

The noise power, to be minimized, is equal to:

$$B = \beta \sum_{i=0}^{M-1} a_i^2 \quad (10)$$

The interpolation error for a rotation $\theta$ is equal to:

$$E(\theta) = \left| \sum_{i=0}^{M-1} a_i e^{j\theta(k_0+i)} - e^{jx\theta} \right|^2 \quad (11)$$

The mean square error is then (12)

$$EQM = \frac{1}{2A} \int_{-A}^{+A} E(\theta) d\theta + B$$

and its (half-)derivative with respect to $a_m$ (m=0 ... M-1):

$$\frac{1}{2} \frac{\delta EQM}{\delta a_m} = \frac{1}{2A} \int_{-A}^{+A} e^{-j\theta(k_0+m)} \left( \sum_{i=0}^{M-1} a_i e^{j\theta(k_0+i)} - e^{jx\theta} \right) d\theta + \beta a_m \quad (13)$$

that is:

$$\frac{1}{2} \frac{\delta EQM}{\delta a_m} = \frac{1}{2A} \left( \sum_{i=0}^{M-1} a_i \int_{-A}^{+A} e^{j\theta(i-m)} d\theta - \int_{-A}^{+A} e^{j\theta(x-k_0-m)} d\theta \right) + \beta a_m$$

or again:

$$\frac{1}{2} \frac{\delta EQM}{\delta a_m} = \sum_{i=0}^{M-1} a_i \frac{\sin((i-m)A)}{(i-m)A} - \frac{\sin((x-k_0-m)A)}{(x-k_0-m)A} + \beta a_m$$

The constraint C is given by:

$$C = \sum_{i=0}^{M-1} a_i - 1 \quad (14)$$

The minimization with constraint will consist in minimizing the quantity: EQM+$\lambda$C with the additional equation C=0

The final system of equations to be resolved therefore has the dimension M+1 with M+1 unknowns, namely $\lambda$ (unused) and $a_{0 \ldots M-1}$ (which must be replaced with $b_{0 \ldots M-1}$ if x=1):

M minimization equations:

$$\sum_{i=0}^{M-1} a_i \frac{\sin((i-m)A)}{(i-m)A} + \beta a_m + \lambda = \frac{\sin((x-k_0-m)A)}{(x-k_0-m)A} \quad (15)$$

$$m = 0 \ldots M-1$$

and for the constraint:

$$\sum_{i=0}^{M-1} a_i = 1$$

The following is an exemplary solution (15):
take the sum of the K first equations and deduct λ therefrom, it being known that the sum of the values $a_i$ is equal to 1:

$$\lambda = \frac{1}{M}\left(\sum_{j=0}^{M-1}\frac{\sin((x-k_0-j)A)}{(x-k_0-j)A} - \sum_{i=0}^{M-1} a_i \frac{\sin((i-j)A)}{(i-j)A} - \beta\right)$$

modify the M first equations:

$$\sum_{i=0}^{M-1} a_i \left(M\frac{\sin((i-m)A)}{(i-m)A} - \sum_{j=0}^{M-1}\frac{\sin((i-j)A)}{(i-j)A}\right) + M\beta a_m =$$

$$\beta + M\frac{\sin((x-k_0-m)A)}{(x-k_0-m)A} - \sum_{j=0}^{M-1}\frac{\sin((x-k_0-j)A)}{(x-k_0-j)A}$$

$$m = 0 \ldots M - 1$$

resolve the system of M modified equations.

The interpolators may be computed, for example, once and for all and stored in a read-only memory.

Furthermore, to be able to adapt to different channels of varying stability (a stable channel corresponds to a low maximum rotation A), sets of interpolators corresponding to different rotational values A are computed.

Figure 6:
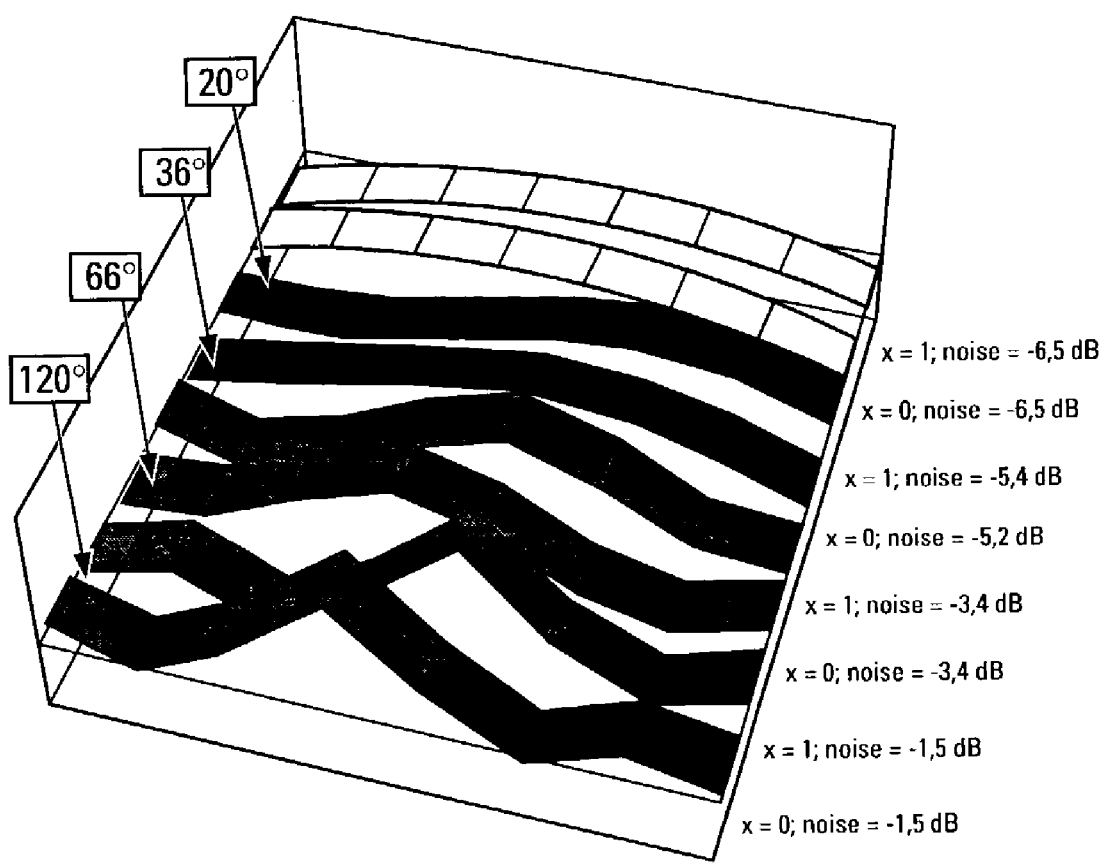
FIG. 6 is a graph showing the values of coefficients of a filter.

FIG. 6 exemplifies coefficients of the filters in the symmetrical case for M=8 elements, ($k_0$=−3 and $k_1$=+4), and rotational values A in (quasi) geometrical progression: $A=A_0 \ldots A_3$=20°, 36°, 66° and 120°.

The values in dB give the effect of noise reduction obtained, namely the ratio between the signal-to-noise ratio of the direct estimation and the signal-to-noise ratio of the smoothened estimation: naturally, the greater the bandwidth of the interpolator (expressed by the value of A), the lower is this noise reduction.

It is the maximum when A is low: here, for A=20°, it is equal to 6.5 dB, which means that the signal-to-noise ratio of the estimated impulse responses is 6.5 dB which is better than what it would have been without the smoothing proposed, and therefore closer to an ideal estimation of the channel.

For the "filtering" part of the improvement proposed, and except in permanent operation, when the reception has just come to an end, there is no longer any signal at the input of the receiver and it is then necessary to terminate the reception with the signal that remains available.

By way of an example, in the document STANAG 4539, the communication is structured into super-frames comprising 72 data blocks and 73 associated probes, and it may be interrupted at each super-frame.

Figure 7:
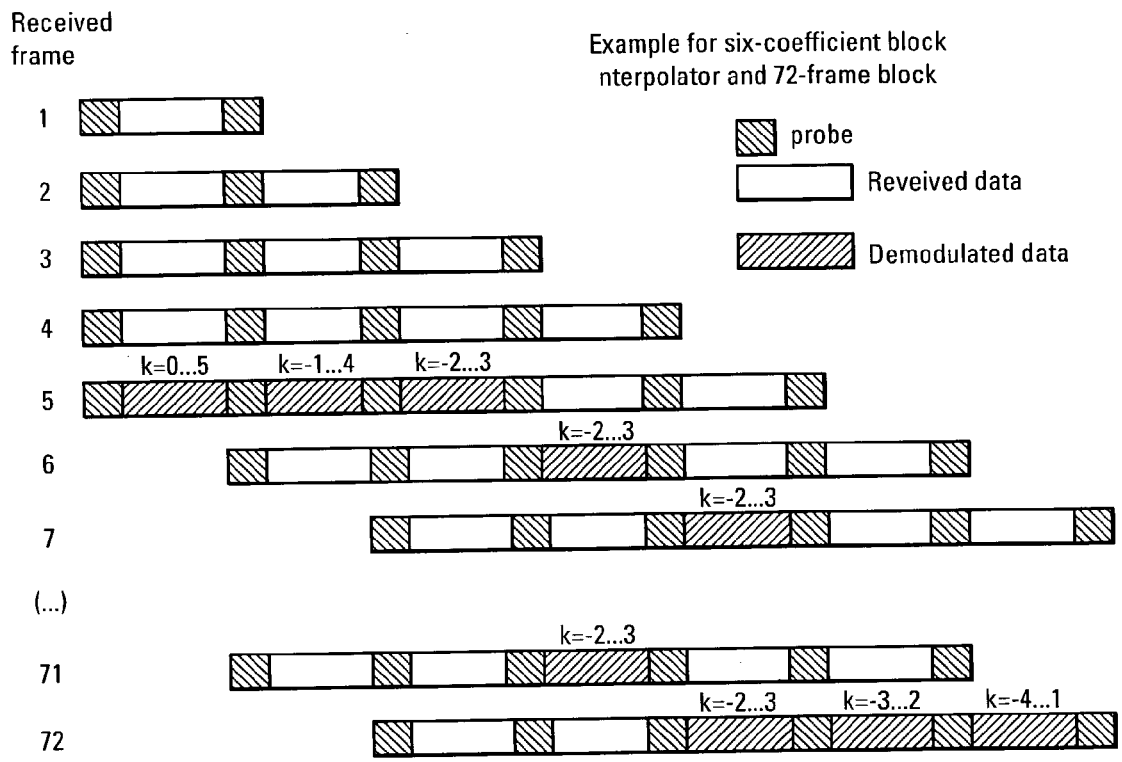
FIG. 7 shows an exemplary interpolation taking account of the edge effects.

FIG. 7 shows an exemplary interpolator with six coefficients and a 72-frame block used to take account of the edge effects. The number M of probes used each time is six in this exemplary embodiment.

At the reception of the frames 1 to 4, no demodulation is done.

After reception of (the probe after) the frame 5, the method demodulates the frames 1 to 3 by using the six probes available (before the frame 1 till after the frame 5) with $k_0$=0 . . . −2 and $k_1$=$k_0$+5 .

After reception of (the probe after) the frames t=6 . . . 71, the method demodulates the frames t=4 . . . 69 by using the six probes on either side of them (3 before, 3 after), with $k_0$=−2 and $k_1$=3.

Finally, after reception of (the probe after) the frame 72, the frames 70 to 72 are demodulated by using the last six probes received with $k_0$=−2 . . . −4 and $k_1$=$k_0$+5.

It can be seen that at the beginning of the super-frame as well as at its end, the number of frames available before and after the frame in progress is different. This is expressed in the form of non-constant sets of values ($k_0$, $k_1$): it is therefore necessary to have, in all, for interpolators comprising M elements, M−1 sets of coefficients, including one symmetrical set (the one most commonly used in the super-frame comprises a large number of frames) while the others are dissymmetrical but correspond to each other in sets of two.

This of course can be extended to a number M, where M is any number whatsoever, of probes used for the filtering, this number being preferably an even number, both for reasons of simplicity (symmetry of the coefficients of the filters) and because in this way the constraint according to which a stable channel should be perfectly interpolated has relatively little influence on the gain in terms of signal-to-noise ratio (the interpolation error shows a "natural" minimum for a zero phase rotation).

According to one embodiment, the method can also be used to select the sets of coefficients used for the filtering or smoothing step.

There are different possibilities of choosing sets of coefficients. Two of them are given by way of an illustration that in no way restricts the scope of the invention.

Rigorous Criterion

The most rigorous criterion is the one that gives the estimated signal-to-noise ratio for the frame after execution of the BDFE algorithm which, it may be recalled, is aimed at determining the most probable values for the symbols sent, taking account of the signal received and the impulse responses of the channel estimated by the means explained here above.

To put it schematically, the final phase of the BDFE method is carried out in N steps (N is the number of unknown symbols sent out for the frame in the course of the modulation).

At the step n (n=0 . . . N−1), estimated values $\hat{e}_0$, $\hat{e}_1$, $\hat{e}_2$, . . . , $\hat{e}_{n-1}$ of the symbols sent are available.

The influence of the previous symbols sent out is then subtracted from the signal received $r_n$, the impulse response of the channel being taken into account, to obtain a corrected value $r'_n$.

Then, in the current "constellation", the point closest to $r'_n$ (decision operation) is determined and it becomes the most probable (complex) value of the $n^{th}$ symbol sent $\hat{e}_n$.

The difference between $r'_n$ and $\hat{e}_n$ is due to the noise (generally speaking, noise including the estimation error of the impulse responses) and the criterion of choice chosen may be the signal-to-noise ratio estimated for the frame as being the ratio between the mean power of the signal (the values of $e_n$) and the mean power of the noise (mathematical expectation of the square of the modulus of the difference before decision):

$$S/B_{est} = \frac{\langle |e_n|^2 \rangle}{\frac{1}{N}\sum_{n=0}^{N-1}|r'_n - \hat{e}_n|^2} \quad (16)$$

Approximate Approach

It may be desirable, albeit at the price of a slight deterioration in performance, to use only an approximate value of this signal-to-noise ratio or a quantity that would be any increasing monotonic function of this ratio for example. This limits the computation power needed because it is not necessary to execute the BDFE algorithm in order to estimate the signal-to-noise ratio.

The reasoning developed here below overlooks the influence of the decision method (which reduces $r'_n$ to $\hat{e}_n$). This explains why its performance is less efficient.

The symbols sent, filtered by $h_0 \ldots {}_{L-1}$, give, in principle, the symbols received.

$$\forall n, r_n = \sum_{j=0}^{j=L-1} e_{n-j} h_j \quad (17)$$

If a noise $x_n$ is added to the received signal, this is equivalent to adding a (fictitious) noise $y_{n-j}$ to the sent signal:

$$\forall n, r_n + x_n = \sum_{j=0}^{j=L-1} (e_{n-j} + y_{n-j}) h_j \quad (18)$$

If the values $y_{n-j}$ have a mean power value $y^2$, the mean power of the values $x_n$, referenced $x^2$, will be:

$$x^2 = y^2 \sum_{j=0}^{j=L-1} |h_j|^2 \quad (19)$$

or conversely:

$$y^2 = \frac{x^2}{\sum_{j=0}^{j=L-1} |h_j|^2} \quad (20)$$

In the BDFE, and overlooking the edge effects, it can be said that the $e_i$ (symbols sent) are obtained from symbols received by the "reverse filter" of h and that, therefore, locally if the noise on the signal received has a power value equal to $\beta$, the noise (without decision) on the values $e_i$ in the vicinity of a position n may be approximated by:

$$y_n^2 = \frac{\beta}{\sum_{j=0}^{j=L-1} |h_j^{(n)}|^2} \quad (21)$$

In the BDFE with linear interpolation, the impulse response of the channel is supposed to vary linearly between an initial response $h_0$ and a final response $h_1$, so much so that it is possible to estimate a mean error on the values $e_i$ as follows:

$$\overline{y^2} = \beta \int_{x=0}^{x=1} \frac{dx}{\sum_{j=0}^{j=L-1} |h_j^0 + x(h_j^1 - h_j^0)|^2} \quad (22)$$

The value of this integral is the following:

$$\overline{y^2} = 2\beta \frac{\arctan\left(\frac{\sqrt{4h_{00}h_{11} - h_{01}^2}}{h_{01}}\right)}{\sqrt{4h_{00}h_{11} - h_{01}^2}} \quad (23)$$

with $$h_{00} = \sum_{j=0}^{j=L-1} |h_j^0|^2$$

$$h_{11} = \sum_{j=0}^{j=L-1} |h_j^1|^2$$

$$h_{01} = \sum_{j=0}^{j=L-1} (h_j^0 h_j^{1*} + h_j^{0*} h_j^1)$$

If we consider a mean impulse response $h^c$ (at the center) and a variation $dh^c$ between the center and the ends, we get (24):

$$h_j^c = \frac{h_j^0 + h_j^1}{2}$$

$$dh_j^c = \frac{h_j^1 - h_j^0}{2}$$

$$H = \sum_{j=0}^{j=L-1} |h_j^c|^2$$

$$\Delta = \sum_{j=0}^{j=L-1} |dh_j^c|^2$$

$$R = \text{Re}\left(\sum_{j=0}^{j=L-1} h_j^c dh_j^{c*}\right)$$

$$\overline{y^2} = \beta \frac{\arctan\left(2\frac{\sqrt{H\Delta - R^2}}{H - \Delta}\right)}{2\sqrt{H\Delta - R^2}}$$

that is, if the difference between $h_0$ and $h_1$, is not too high, which corresponds to a Doppler spread (or to an uncompensated Doppler spread) that is not excessive (25):

$$\overline{y^2} \approx \frac{\beta}{H - \Delta}$$

In short, the simplified criterion (proportional to the theoretical signal-to-noise ratio of the signal before decision) can be expressed by (26):

$$S/B_{est\ simp.} \approx \frac{1}{\sum_{j=0}^{j=L-1} |h_{1,j} + h_{0,j}|^2 - \sum_{j=0}^{j=L-1} |h_{1,j} - h_{0,j}|^2}$$

i.e. in an even simpler form (27):

$$S/B_{est\ simp.} \approx \frac{1}{\sum_{j=0}^{j=L-1} h_{0,j} h_{1,j}^* + h_{0,j}^* h_{1,j}}$$

EXAMPLE OF A LOGIC OF CHOICE

The current set of interpolators will be chosen, for example, whenever a given number of frames has been processed The proposed algorithm takes account of the fact that, from one frame (data block) to another, there is little variation in the statistical properties of the channel and that the sets of interpolators has been arranged in such a way that two neighbouring sets are optimised for neighbouring Doppler spreads.

If, at the preceding frame, the interpolator corresponding to $A_p$ has been chosen (p=0 . . . 3 in this example), the demodulation will be done with the interpolators corresponding to $A_{p-1}$ (if possible), $A_p$, and $A_{p+1}$ (if possible) and it is the interpolator giving the best results that will serve as a starting point for the next frame.

Figure 8:
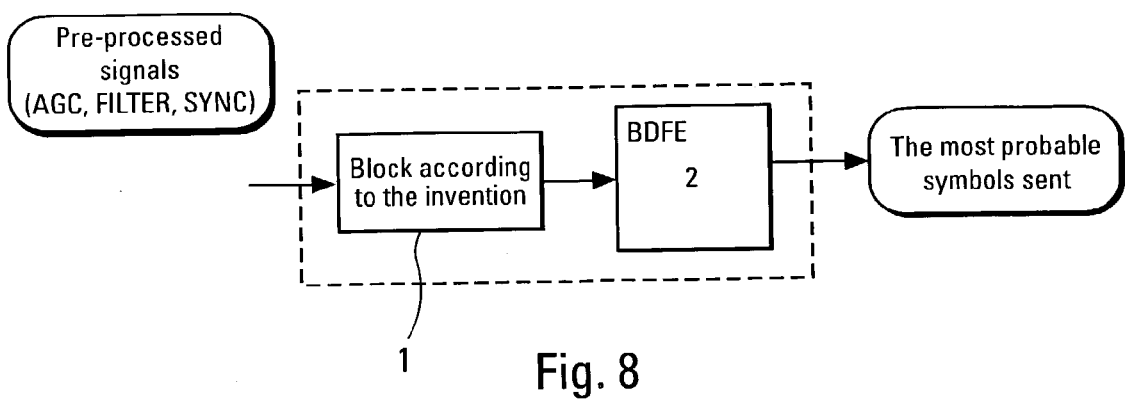
FIG. 8 is a block diagram of an exemplary device according to the invention.

FIG. 8 gives a schematic view of a structure of the device according to the invention. The signal or signals, preconditioned after passage into a set of commonly used devices, comprising adapted filters, an AGC (automatic gain control device, etc.) and all the devices enabling the preconditioning, is or are transmitted for example to a microprocessor 1 provided with the software designed to execute the different steps mentioned here above. The results obtained are then transmitted to a BDFE algorithm, 2, that can be used to obtain the most probable symbols sent, according to a method known to those skilled in the art.

What is claimed is:

1. A method for a equalization of a signal received by a receiver after the signal has traveled through a transmission channel, the signal including at least one data block and several probes located on either side of the data block, the method comprising the steps of:
   estimating an impulse response of the channel before and after a data block n; and
   taking account of the probes (Probe n−1 and Probe n) located on either side of the data block n and also of the probes that precede and follow the Probes n−1 and Probe n, weighting and combining said probes being with one another,
further comprising a step obtaining a coefficients used for a smoothing of the probes are obtained by minimizing a mean square error of a interpolation error $$E(\theta) = \left| \sum_{i=0}^{M-1} a_i e^{j\theta(k_0+i)} - e^{jx\theta} \right|^2$$

where θ is a phase rotation, included between two extreme values −A and +A that depend on a speed of variation of a transfer function of the channel:
   wherein, the phase rotation between two positions is equal to A at most in terms of absolute value (A<π):
   M=$k_1$−$k_0$+1:
   0≦x≦1:
   $k_0$+i=different signal positions: and
   a=real coefficients between $\alpha_0 \ldots \alpha_{M-1}$.

2. The method according to claim 1 comprising at least the following steps: for each probe positioned before the data block to be processed and for each probe located after the data block to be processed, each of the probes is replaced by smoothened probes and then the impulse response $h_0$ before the data block and the impulse response $h_1$ after the data block are estimated.

3. The method according to claim 2, comprising a step in which the coefficients used for the smoothing of the probes are obtained by minimizing the mean square error of the interpolation error $$E(\theta) = \left| \sum_{i=0}^{M-1} a_i e^{j\theta(k_0+i)} - e^j \times \theta \right|^2$$

where θ is the phase rotation, included between two extreme values −A and +A that depend on the speed of variation of the transfer function of the channel:
   wherein, the phase rotation between two positions is equal to A at most in terms of absolute value (A<π):
   M=$k_1$−$k_0$+1:
   0≦x≦1:
   $k_0$+i=different signal positions: and
   a=real coefficients between $\alpha_0 \ldots \alpha_{M-1}$.

4. The method according to claim 2, wherein there are several sets of interpolation coefficients available, each set being optimized for very precise conditions of reception where, at regular intervals, sets that are neighbors of the one set of interpolation coefficients being used are tried and where, for a subsequent part of an operation, a set chosen is the one set of interpolation coefficients that maximizes a demodulation signal-to-noise ratio that can be estimated in various ways.

5. The method according to claim 2, wherein a demodulation of signals received in a BDFE device.

6. The method according to claim 1 comprising at least the following steps: for each probe positioned before the data block to be processed and for each probe located after the data block, an associated impulse response is estimated and then, by weighting and combination, the impulse response $h_0$ before the data block and the impulse response $h_1$ after the data block are estimated.

7. The method according to claim 6, comprising a step in which the coefficients used for the smoothing of the probes are obtained by minimizing the mean square error of the interpolation error $$E(\theta) = \left| \sum_{i=0}^{M-1} a_i e^{j\theta(k_0+i)} - e^j \times \theta \right|^2$$

where θ is the phase rotation, included between two extreme values −A and +A that depend on the speed of variation of the transfer function of the channel:
   wherein, the phase rotation between two positions is equal to A at most in terms of absolute value (A<π):
   $M = k_1 k_0 + 1$:
   $0 \leq x \leq 1$:
   $k_0 + i$ = different signal positions: and
   a = real coefficients between $\alpha_{0 \ldots M-1}$.

8. The method according to claim 6, wherein there are several sets of interpolation coefficients available, each set being optimized for very precise conditions of reception where, at regular intervals, sets that are neighbors of the one being used are tried and where, for a subsequent part of an operation, a set chosen is the one that maximizes a demodulation signal-to-noise ratio that can be estimated in various ways.

9. The method according to claim 6, wherein a demodulation of signals received in a BDFE device.

10. The method according to claim 1, wherein the estimation is made by minimizing the total mean square error given by:

$$E = \sum_{n=Na}^{N_i} \left| \sum_{m=0}^{L-1} d_{n-m} h_m - r_n \right|^2$$

with
   $d_{n-m}$ = known signal sent
   $h_m$ = sample of the impulse response
   $I_m$ = received samples
   L = length of the impulse response (in symbols) of the channel to be estimated
   N = the number of symbols of a data block.

11. The method according to claim 10, comprising a step in which the coefficients used for the smoothing of the probes are obtained by minimizing the mean square error of the interpolation error $$E(\theta) = \left| \sum_{i=0}^{M-1} a_i e^{j\theta(k_0+i)} - e^j \times \theta \right|^2$$

where θ is the phase rotation, included between two extreme values −A and +A that depend on the speed of variation of the transfer function of the channel the phase rotation between two positions is equal to A at most in terms of absolute value (A<π):
   wherein, the phase rotation between two positions is equal to A at most in terms of absolute value (A<π):
   $M = k_1 - k_0 1$:
   $0 \leq x \leq 1$:
   $k_0 + i$ = different signal positions: and
   a = real coefficients between $\alpha_{0 \ldots M-1}$.

12. The method according to claim 10, wherein there are several sets of interpolation coefficients available, each set being optimized for very precise conditions of reception where, at regular intervals, sets tint are neighbors of the one being used are tried and where, for a subsequent part of an operation, a set chosen is the one that maximizes a demodulation signal-to-noise ratio that can be estimated in various ways.

13. The method according to claim 10, wherein a demodulation of signals received in a BDFE device.

14. The method according to claim 1, wherein there are several sets of interpolation coefficients available, each set being optimized for very precise conditions of reception where, at regular intervals, sets that are neighbors of the one set of interpolation coefficients being used are tried and where, for a subsequent part of an operation, a set chosen is the one set of interpolation coefficients that maximizes a demodulation signal-to-noise ratio that can be estimated in various ways.

15. The method according to claim 1, wherein a demodulation of signals received in a BDFE device.

16. The method according to claim 1, wherein there are several sets of interpolation coefficients available, each set being optimized for very precise conditions of reception where, at regular intervals, sets that are neighbors of the one being used are tried and where, for a subsequent part of an operation, a set chosen is the one that maximizes a demodulation signal-to-noise ratio that can be estimated in various ways.

17. The method according to claim 1, wherein a demodulation of signals received in a BDFB device.

18. A device used to equalize at least one signal having traveled through a transmission channel, the signal including at least one data block and several probes located on either side of the data block, the device comprising:
   at least one means receiving signals and adapted to estimate impulse response of the channel before and after a data block n in taking account of the probes (Probe n−1 and Probe n) located on either side of the data block xi and also of the probes that precede and follow the Probes n−1 and Probe n, a BDFE type device combining and weighting said probes with one another and at a BDFE type device,
   further comprising a step obtaining a coefficients used for a smoothing of the probes are obtained by minimizing a mean square error of a interpolation error $$E(\theta) = \left| \sum_{i=0}^{M-1} a_i e^{j\theta(k_0+i)} - e^j \times \theta \right|^2$$

where θ is a phase rotation, included between two extreme values −A and +A that depend on a speed of variation of a transfer function of the channel:
   wherein, the phase rotation between two positions is equal to A at most in terms of absolute value (A<π):
   $M = k_1 k_0 + 1$:
   $0 \leq x \leq 1$:
   $k_0 + i$ = different signal positions: and
   a = real coefficients between $\alpha_{0 \ldots M-1}$.

19. The device according to claim 18, wherein the coefficients used for the smoothing of the probes are obtained by minimizing the mean square error of the interpolation error $$E(\theta) = \left| \sum_{i=0}^{M-1} a_i e^{j\theta(k_0+i)} - e^j \times \theta \right|^2$$

where θ is the phase rotation, included between two extreme values −A and +A that depend on the speed of variation of the transfer function of the channel:

wherein, the phase rotation between two positions is equal to A at most in terms of absolute value (A<π):

M=$k_1$−$k_0$+1:

0≦×≦1:

$k_0$+i=different signal positions: and a=real coefficients between $\alpha_0 \ldots _{M-1}$.

* * * * *